United States Patent [19]

Landrum et al.

[11] Patent Number: 5,321,062

[45] Date of Patent: Jun. 14, 1994

[54] SUBSTITUTED ALKOXY BENZENE AND USE THEREOF AS WETTING AID FOR POLYEPOXIDE RESINS

[75] Inventors: Bruce E. Landrum; Jimmie D. Weaver; Joseph R. Murphey, all of Duncan, Okla.

[73] Assignee: Halliburton Company, Duncan, Okla.

[21] Appl. No.: 963,959

[22] Filed: Oct. 20, 1992

[51] Int. Cl.$^5$ ............... C08L 63/02; C08L 63/04
[52] U.S. Cl. ............... 523/414; 166/276; 166/295; 523/130; 523/131; 523/420
[58] Field of Search ............... 523/414, 130, 131; 166/276, 295

[56] References Cited

U.S. PATENT DOCUMENTS

| Re. 25,747 | 3/1965 | Hilton, Jr. et al. | 166/33 |
|---|---|---|---|
| 3,250,330 | 5/1966 | Smith, Jr. | 155/33 |
| 3,294,165 | 12/1966 | Meijs et al. | 166/33 |
| 3,308,884 | 3/1967 | Robichaux | 166/33 |
| 3,419,072 | 12/1968 | Maly et al. | 166/33 |
| 3,625,287 | 12/1971 | Young | 166/295 |
| 3,857,444 | 12/1974 | Copeland | 166/276 |
| 3,960,801 | 6/1976 | Cole et al. | 260/33.6 |
| 3,975,305 | 8/1976 | Tai et al. | 252/500 |
| 4,000,781 | 1/1977 | Knapp | 166/276 |
| 4,042,031 | 8/1977 | Knapp | 166/276 |
| 4,074,760 | 2/1978 | Copeland et al. | 166/276 |
| 4,081,030 | 3/1978 | Carpenter et al. | 166/276 |
| 4,101,474 | 7/1978 | Copeland et al. | 260/13 |
| 4,199,484 | 4/1980 | Murphey | 260/13 |
| 4,216,829 | 8/1980 | Murphey | 166/276 |
| 4,247,430 | 1/1981 | Constien | 260/29.2 |
| 4,291,766 | 9/1981 | Davies et al. | 166/276 |
| 4,829,100 | 5/1989 | Murphey et al. | 523/131 |
| 4,875,525 | 10/1989 | Mana | 166/280 |
| 4,921,047 | 5/1990 | Summers et al. | 166/276 |
| 4,923,714 | 5/1990 | Gibb et al. | 427/221 |
| 4,942,186 | 7/1990 | Murphey et al. | 523/131 |

Primary Examiner—John C. Bleutge
Assistant Examiner—D. Aylward
Attorney, Agent, or Firm—Robert A. Kent; Clifford C. Dougherty

[57] ABSTRACT

A substituted alkoxy benzene having the formula

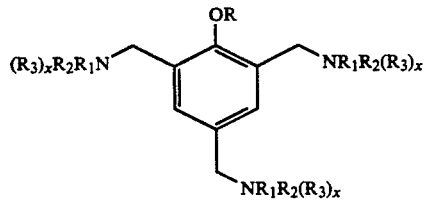

wherein R, $R_1$, $R_2$ and $R_3$ are each a hydrocarbon radical having from 1 to 8 carbon atoms and x is 0 or 1 is provided. The substituted alkoxy benzene is very useful as a wetting aid for enhancing the ability of hardenable polyepoxide resin compositions to coat and bond to material (e.g., particulate material) in high temperature applications. The substituted alkoxy benzene does not significantly accelerate the curing rate of the resins. A polyepoxide resin composition for coating and bonding to a material, a composition useful for forming a hard permeable mass in a remote location and a method of continuously forming and suspending consolidatible resin composition coated particulate material in a gelled aqueous carrier liquid and transporting the coated particulate material to a remote location where the material is consolidated are also provided.

11 Claims, No Drawings

SUBSTITUTED ALKOXY BENZENE AND USE THEREOF AS WETTING AID FOR POLYEPOXIDE RESINS

BACKGROUND OF THE INVENTION

1. Field of the Invention

In one aspect, the invention relates to substituted alkoxy benzenes. In another aspect, the invention relates to polyepoxide resin compositions. In a preferred embodiment, the invention relates specifically to polyepoxide resin compositions and associated methods useful for consolidating particulate material, e.g., sand, into hard permeable masses in subterranean formations.

2. Description of the Prior Art

Polyepoxide resin compositions and associated methods useful for consolidating particulate material into hard permeable masses have been developed and used heretofore. Such compositions and methods are commonly used in the oil and gas industry, for example, to form hard permeable masses in subterranean formations containing loose or incompetent sands. The hard permeable masses reduce or prevent migration of the loose or incompetent sands into the well bores with hydrocarbons produced from the formations. Such compositions and methods are also commonly used in the oil and gas industry in well stimulation procedures such as formation fracturing wherein hard permeable masses of particulate material are used to keep fractures open and/or prevent loose proppants from flowing back into the well bores.

One technique which has heretofore been utilized successfully for forming a consolidated, permeable particulate mass in a producing formation involves coating the formation sand adjacent the well bore with a hardenable polyepoxide resin and then causing the resin to harden. An alternate technique used heretofore involves coating sand or other particulate material with a hardenable polyepoxide resin on the surface, suspending the coated material in a gelled aqueous carrier liquid and pumping the suspension by way of the well bore into the formation whereby the resin coated material is deposited therein. The component streams can be batch mixed or continuously mixed "on-the-fly". The resin on the deposited material is caused or permitted to harden whereby a solid, permeable particulate mass is formed.

Methods of forming and suspending consolidatible polyepoxide resin coated particulate material in a gelled aqueous carrier liquid and transporting the coated particulate material by way of the gelled aqueous carrier liquid to a zone in which it is consolidated on a substantially instantaneous and continuous basis are described in U.S. Pat. No. 4,829,100 to Murphey et al. issued May 9, 1989. In accordance with such methods, substantially continuous streams of a gelled aqueous carrier liquid, uncoated particulate material, a polyepoxide resin composition which will subsequently harden and a surface active agent are admixed whereby the particulate material is continuously coated with the resin composition and suspended in the gelled aqueous carrier liquid. The resin has a sufficiently long curing or working time to enable continuous deposition of the suspension of gelled aqueous carrier liquid and coated particulate material in a desired location of a subterranean zone. Subsequent hardening of the resin in the zone produces the desired hard permeable mass of consolidated particulate material.

A problem often encountered with compositions and methods for consolidating particulate material into hard permeable masses is insufficient coating of the particulate material with the polyepoxide resin. It is difficult to coat particulate material with a polyepoxide resin in an aqueous environment, particularly an aqueous environment associated with high temperature and other adverse conditions. For example, when exposed to a high temperature (e.g., above about 160° F.), the resin tends to disperse as finer droplets in the aqueous phase as opposed to sticking to the surfaces of the particulate material. The time for condensation of the droplets is increased. The problem is even further magnified when the aqueous phase of the system is viscosified with guar gum and/or other viscosifiers. Insufficient resin coating of the particulate material causes the consolidated mass to have a relatively low compressive strength.

As a solution, various surface active agents have been used to strongly oil wet the particulate material in order to increase the ability of the resin to wet the material; however, under high temperature and other adverse conditions, insufficient resin wetting still occurs. It is known that certain compounds used for accelerating or catalyzing the epoxide resin curing reaction also improve the ability of the resin to wet particulate material. For example, U.S. Pat. No. 4,291,766 to Davies et al. discloses the use of dimethylaminomethylene phenol to improve resin wetting of particulate material. It is disclosed that the dimethylaminomethylene phenol also accelerates the epoxide resin curing reaction. Unfortunately, the increased rate of curing can cause premature hardening of the resin in high temperature environments where accelerated curing occurs naturally. Premature hardening of the resin can prevent the coated particles from being placed in the formation where desired and cause serious damage to the formation, well bore and/or pumping equipment. The increased rate of curing can also cause the resin to cure before it even has a chance to coat the particulate material. Although curing retarders can be included to slow the reaction down, they can be costly and problematic. Because the retarding reaction is pH, temperature and concentration dependent, it can be difficult to select the right type and amount of retarders to use.

SUMMARY OF THE INVENTION

By the present invention, a substituted alkoxy benzene has been discovered. It has been found that the substituted alkoxy benzene is very useful as a wetting aid for hardenable polyepoxide resins. The substituted alkoxy benzene is effective in high temperature environments and does not significantly accelerate the curing rate of the resins. It improves the wetting ability and associated bonding strength of hardenable polyepoxide resins in essentially all applications in which such resins are used. The substituted alkoxy benzene is particularly suitable for enhancing the ability of hardenable polyepoxide resin compositions to rapidly coat particulate material and consolidate the material into hard, permeable masses in remote locations.

In a first aspect, the invention consists of a substituted alkoxy benzene having the formula:

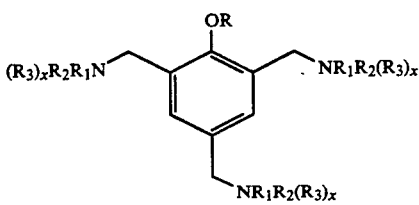

wherein R, $R_1$, $R_2$ and $R_3$ are each a hydrocarbon radical having from 1 to 8 carbon atoms, and x is 0 or 1. In one embodiment, R is a methyl, benzyl or acetyl radical, $R_1$ and $R_2$ are each a methyl radical and x is 0. In another embodiment, x is 1, R is an acetyl radical or a benzyl radical, and $R_1$ is a benzyl or methyl radical and $R_2$ and $R_3$ are each a methyl radical if R is an acetyl radical, and $R_1$ is a benzyl radical and $R_2$ and $R_3$ are each a methyl radical if R is a benzyl radical.

Methods of preparing the substituted alkoxy benzene are provided. The substituted alkoxy benzene is very useful as a wetting aid for enhancing the ability of a hardenable polyepoxide resin composition to coat and bond to a material.

In a second aspect, the invention consists of a polyepoxide resin composition for coating and bonding to a material. The composition comprises:
(a) a hardenable polyepoxide resin;
(b) a substantially water immiscible diluent present in the composition in an amount sufficient to lower the viscosity of the composition;
(c) a hardening agent; and
(d) a wetting aid for enhancing the ability of the composition to coat and bond to the material, the wetting aid being the substituted alkoxy benzene forming the first aspect of the invention.

Each of the components (a)-(d) of the above resin composition are preferably different compounds or different mixtures of compounds. The resin composition can be used to coat and bond to any material. For example, the resin composition can be used to bond pipe sections together. The wetting aid enhances (improves) the bond. The resin composition is particularly useful in oil and gas well completion and stimulation procedures.

In a third aspect, the invention consists of a composition useful in forming a hard permeable mass in a remote location. The composition of this aspect of the invention comprises:
(a) an aqueous liquid;
(b) a hydratable gelling agent;
(c) particulate material;
(d) a resin composition that will subsequently harden for coating the particulate material, the resin composition being the polyepoxide resin composition forming the second aspect of the invention; and
(e) a surface active agent for enhancing the ability of the resin composition to coat the particulate material.

Each of the components (a)-(e) of the above composition are preferably different compounds or different mixtures of compounds. In use, the aqueous liquid and gelling agent of the composition form a gelled aqueous carrier liquid. The resin composition is dispersed in the carrier liquid together with the particulate material and surface active agent whereby the particulate material is coated with the resin composition and suspended in the carrier liquid.

The resulting composition can be used, for example, to deposit resin coated particulate material in a high temperature subterranean zone between a hydrocarbon producing formation and a well bore whereby it is consolidated into a hard permeable mass therein. The permeable particulate mass functions to prevent migration of loose or incompetent material in the producing formation with hydrocarbons produced therefrom. The composition can also be used to place consolidated, permeable masses of resin coated particulate material in fractures formed in fracture stimulation procedures to keep the fractures open and/or prevent loose proppants from flowing back into the well bore with produced hydrocarbons.

In a fourth aspect, the invention consists of a method of continuously forming and suspending consolidatible resin composition coated particulate material in a gelled aqueous carrier liquid and transporting the resulting composition to a zone in which the particulate material is to be consolidated. The method comprises admixing continuous streams of the gelled aqueous carrier liquid, uncoated particulate material, a polyepoxide resin composition that will subsequently harden and a surface active agent for enhancing the ability of the resin composition to coat the particulate material whereby the particulate material is continuously coated with the resin composition and suspended in the gelled aqueous carrier liquid. The polyepoxide resin composition is the polyepoxide resin composition forming the second aspect of the invention. The gelled aqueous carrier liquid having consolidatible resin composition coated particulate material suspended therein is transported to the desired zone by way of the well bore.

The inventive substituted alkoxy benzene greatly enhances the ability of hardenable polyepoxide resin compositions to rapidly wet, coat and bond to sand and other particulate material. Masses of particulate material coated and consolidated by polyepoxide resins in the presence of the inventive substituted alkoxy benzene have greater compressive strengths (e.g., two- or three-fold greater) due to the enhanced wetting and bonding strength. The compressive strength of a mass of consolidated particulate material is very important in many applications. For example, a consolidated mass of particulate material used to keep a formation fracture open can crush upon exposure to the fracture pressure when the fracturing job is complete if the compressive strength of the mass is too low. The inventive substituted alkoxy benzene also decreases the amount of resin composition and particulate material needed for some jobs.

The inventive substituted alkoxy benzene, compositions and method are very suitable for use in high temperature applications. Unlike wetting aids used heretofore, the inventive substituted alkoxy benzene enhances the wetting ability of hardenable polyepoxide resin compositions at temperatures of 160° F and higher. The inventive substituted alkoxy benzene and associated compositions and method are particularly suitable in high temperature and other applications wherein enhancement of the wetting ability of a hardenable polyepoxide resin composition is important but acceleration of the epoxide resin curing reaction is not desired. The inventive substituted alkoxy benzene does not significantly accelerate the rate at which the epoxide resin cures.

The inventive substituted alkoxy benzene and associated compositions and method are also particularly suitable in applications wherein rapid coating of particulate material by a hardenable polyepoxide resin composition is important. For example, the inventive substituted alkoxy benzene enhances the ability of a hardenable polyepoxide resin composition to coat particulate material in a gelled aqueous carrier liquid "on-the-fly", i.e., to coat particulate material by admixing and pumping the particulate material, polyepoxide resin composition and a gelled aqueous carrier liquid into the well bore on a substantially instantaneous and continuous basis.

It is, therefore, a general object of the present invention to provide a new and useful substituted alkoxy benzene.

It is also an object of the present invention to provide an improved wetting aid for hardenable polyepoxide resin compositions that is effective in high temperature environments and does not significantly accelerate curing of the resin.

A further object of the present invention is to provide hardenable polyepoxide resin compositions that are particularly suitable for coating particulate material on a rapid basis and forming hard permeable masses of the material in remote locations such as high temperature subterranean zones penetrated by well bores.

Another object of the present invention is to provide an improved method of continuously forming and suspending consolidatible resin composition coated particulate material in a gelled aqueous carrier liquid and transporting the coated particulate material to a zone in which the particulate material is to be consolidated.

Additional objects, features and advantages of the invention will be readily apparent to those skilled in the art upon a reading of the description of preferred embodiments which follows.

DESCRIPTION OF PREFERRED EMBODIMENT

This invention includes a substituted alkoxy benzene, a polyepoxide resin composition for coating and bonding to a material in general, a specific composition useful in forming a hard permeable mass in a remote location, and a method of continuously forming and suspending consolidatible resin composition coated particulate material in a gelled aqueous carrier liquid.

As mentioned above, polyepoxide resin compositions useful for forming hard permeable masses in remote locations have been developed and used heretofore. Also, methods of continuously forming and suspending consolidatible resin composition coated particulate material in a gelled aqueous carrier liquid and transporting the coated particulate material by way of the carrier liquid to a zone in which the particulate material is consolidated have been known and used heretofore. Such compositions and methods are described in U.S. Pat. No. 4,829,100, issued May 9, 1989, which is incorporated herein by reference.

The Substituted Alkoxy Benzene

The inventive substituted alkoxy benzene is a compound having the general formula:

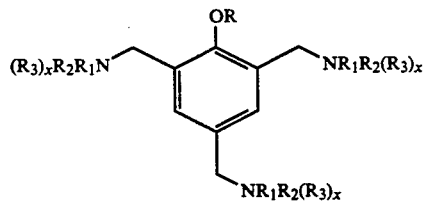

wherein R, $R_1$, $R_2$ and $R_3$ are each a hydrocarbon radical having from 1 to 8 carbon atoms, and x is 0 or 1.

R, $R_1$, $R_2$ and $R_3$ can all be the same or can each be different. As used herein and in the appended claims, a hydrocarbon radical means a substituted or unsubstituted aliphatic (alkane, alkene or alkyne) or aryl hydrocarbon radical.

Examples of hydrocarbon radicals suitable for R, $R_1$, $R_2$ and $R_3$ of the above general formula include methyl, ethyl, propyl, butyl, pentyl, hexyl, heptyl and octyl radicals including all structural isomers thereof, unsubstituted and substituted phenyl, benzyl, toluyl and benzoyl radicals, acetyl and other "carbonyl" containing hydrocarbon radicals, and methylene, 1-2-ethyl, 1-3-propyl, 1-4-butyl, ethenyl, ethynyl, propenyl, propynyl, butenyl, butynyl, and cyclohexyl radicals.

In a first embodiment of the inventive substituted alkoxy benzene, $R_1$ and $R_2$ of the above general formula are each a methyl radical and x of the formula is 0. R of this embodiment is preferably a methyl ($CH_3$) radical, a benzyl ($C_6H_5CH_2$) radical, an acetyl ($CH_3CO$) radical or a disubstituted alkyl radical. If R of this embodiment is a disubstituted alkyl radical, it is preferably an ethenylene radical (e.g., 1,2-dichloroethene) or a butylene radical (e.g., 1,4-dibromobutane), more preferably an ethenylene radical. More preferably, R of this embodiment is a methyl radical, a benzyl radical or an acetyl radical. Most preferably, R of this embodiment is a benzyl radical.

For example, when R of the first embodiment of the substituted alkoxy benzene is a methyl radical, the compound is 2,4,6-tris(dimethylaminomethylene)methoxybenzene having the structural formula:

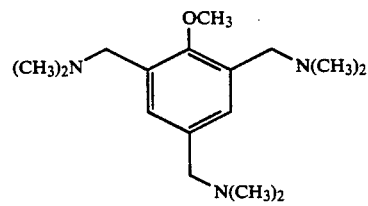

When R of the first embodiment of the substituted alkoxy benzene is a butylene radical, the compound is a butyl-bridged dimer having the structural formula:

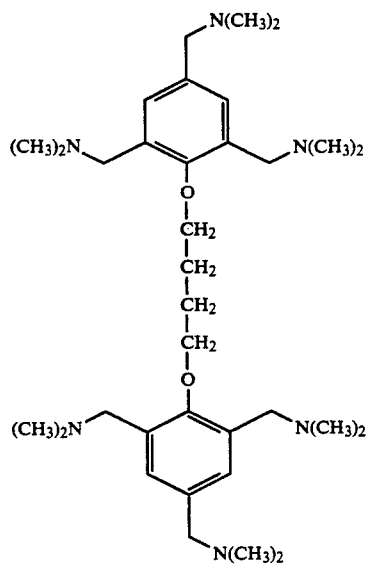

In a second embodiment of the inventive substituted alkoxy benzene, R of the above general formula is an acetyl radical or a benzyl radical and x of the formula is 1. If R is an acetyl radical, either $R_1$, $R_2$, and $R_3$ are each a methyl radical or $R_1$ is a benzyl radical and $R_2$ and $R_3$ are each a methyl radical. If R is a benzyl radical, $R_1$ is a benzyl radical and $R_2$ and $R_3$ are each a methyl radical. Preferably, in this embodiment, R and $R_1$ are each a benzyl radical and $R_2$ and $R_3$ are each a methyl radical.

For example, in the second embodiment, when R is an acetyl radical and $R_1$, $R_2$ and $R_3$ are each a methyl radical, the compound is 2,4,6-tris(trimethylammonium-methylene)acetoxybenzene having the structural formula:

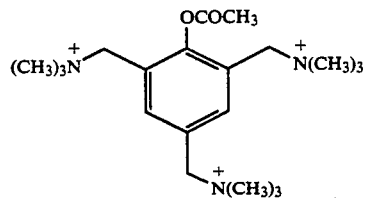

In the second embodiment, when R and $R_1$ are each a benzyl radical and $R_2$ and $R_3$ are each a methyl radical, the compound is 2,4,6-tris(benzyldimethylammonium-methylene)benzyloxybenzene having the structural formula:

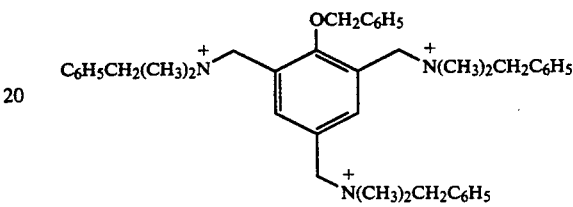

Of the first and second embodiments of the inventive wetting aid, the second embodiment is preferred.

The first embodiment of the inventive substituted alkoxy benzene as described above is preferably prepared as follows: First, 2,4,6-tri(dimethylaminomethylene) phenol (1) (an available compound) is reacted with a strong base (pH≧10) such as sodium hydroxide to form a phenoxide (2). This reaction can be carried out in tetrahydrofuran, alcohol or water as a solvent. The phenoxide (2) is then reacted with an alkyl halide (e.g., methyl iodide (3) or 1,2-dichloroethane (4) to form an amine substituted alkoxy benzene (e.g., 2,4,6-tris(dimethylaminomethylene)methoxybenzene (5) or 1,2-[2,4,6-tris(dimethylaminomethylene)phenoxy]ethylene (6)).

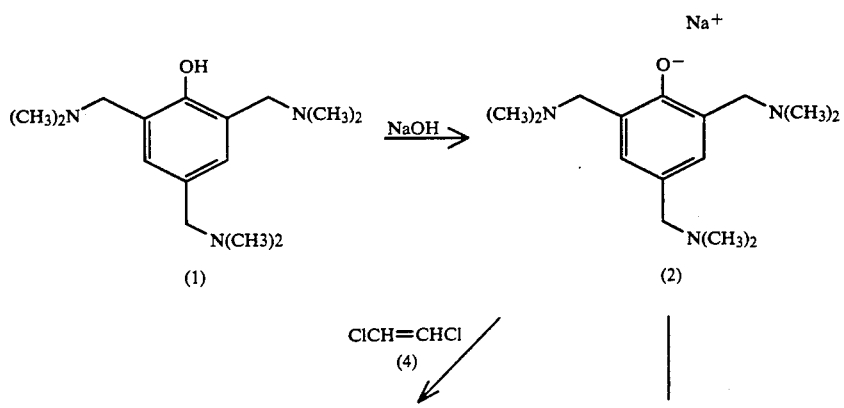

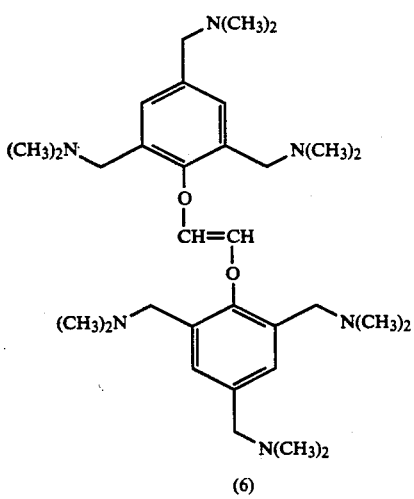

(6)

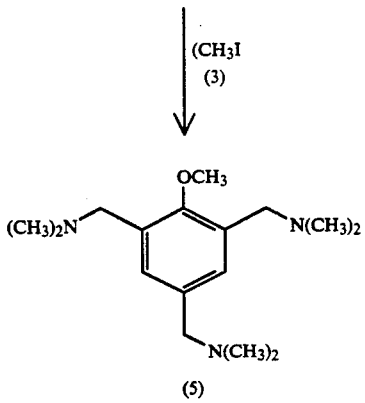

(5)

The second embodiment of the inventive substituted alkoxy benzene as described above is preferably prepared by reacting the first embodiment of the inventive wetting aid in which R of the above general formula is an acetyl or benzyl radical (e.g., 2,4,6-tris(dimethylaminomethylene)benzyloxybenzene (1) (prepared as described above) with an alkyl halide (e.g., benzyl chloride) (2) to form an ammonium substituted alkoxy benzene (e.g., 2,4,6-tris(benzyldimethylammoniummethylene)1-benzyloxybenzene (3).

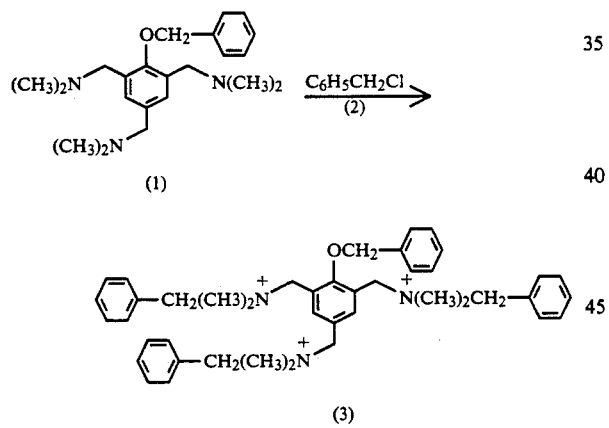

The reaction with an alkyl halide forming the "alkoxy" portion of the benzene and the reaction with an alkyl halide forming the "trisammonium salt" portions of the benzene can be performed concomitantly if the alkyl halide used in each reaction is the same. For example, if R and R₁ of the above general formula of the inventive substituted alkoxy benzene are each a benzyl radical and R₂ and R₃ of the formula are each a methyl radical, the two reactions can be performed concomitantly using benzyl chloride.

As stated above, the inventive substituted alkoxy benzene is particularly useful as a wetting aid for enhancing the ability of a hardenable polyepoxide resin composition to coat and bond to a material.

The Polyepoxide Resin Composition In General

The inventive polyepoxide resin composition for coating and bonding to a material in general (hereinafter "the general composition") includes a hardenable polyepoxide resin, a substantially water immiscible diluent present in the composition in an amount sufficient to lower the viscosity of the composition, a hardening agent, and a wetting aid for enhancing the ability of the composition to coat and bond to the material. The wetting aid is the inventive substituted alkoxy benzene (including all embodiments thereof).

The wetting aid is preferably employed in the general composition in an amount in the range of from about 1 to about 9 parts by weight, more preferably from about 2 to about 4 parts by weight, per 100 parts by weight of the hardenable polyepoxide resin. The exact amount of the wetting aid employed in the composition will vary somewhat depending on the specific form of the substituted alkoxy benzene employed and the types and amounts of other components used. When used to consolidate particulate material into a hard, permeable mass in a subterranean formation, the wetting aid is most preferably employed in the general composition in an amount in the range of from about 2 to about 3 parts by weight per 100 parts by weight of the polyepoxide resin.

Polyepoxide resins that can be utilized in the general composition include condensation products of epichlorohydrin and multiple hydroxy compounds such as resorcinol hydroquinone, glycerine, pentaerythritol, 1,4-butanediol, phloroglucinol, bisphenol A and bisphenol F. The structural formula of bisphenol A is as follows:

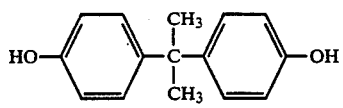

A commercially available such product is marketed by the Shell Chemical Company of Houston, Texas, under the trade name EPON 828 ™. EPON 828 ™ resin exhibits good temperature stability and chemical resistance, and has a viscosity of about 15,000 centipoises.

The polyepoxide resin utilized in the general composition preferably includes at least about 20% by weight of a multifunctional (three or more reactive epoxide groups per molecule) epoxy novolac resin made, for example, by condensing a phenol novolac oligomer (a phenol-formaldehyde resin having, e.g., 2 to 15 monomer units) with epichlorohydrin. A representative structure of such a resin is as follows:

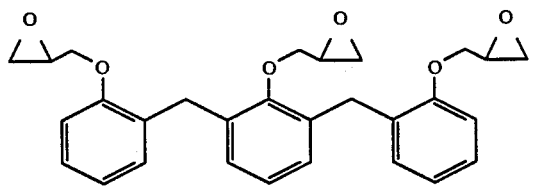

A commercially available epoxy novolac resin formulation including at least about 30% by weight of multi-functional epoxy novolac resin together with di-functional polyepoxide resin (the formulation has an average of 2.5 reactive epoxide groups per molecule) and very suitable for use as the polyepoxide resin employed in the general composition is marketed by Rhone Poulenc Corp. under the trade designation "EPI-REZ SU-2.5".

The amount of polyepoxide resin utilized in forming the general composition will vary depending on the particular application. For example, more resin is required in applications involving totally unconsolidated sands.

The substantially water immiscible diluent utilized in the general composition functions to lower the viscosity of the composition without adversely affecting other desirable properties thereof. The diluent is present in the composition in an amount sufficient to adjust the viscosity of the composition to a desired level, generally a level in the range of from about 100 centipoises to about 800 centipoises. In some applications, it is preferred to use two polar organic diluents which are miscible with the hardenable polyepoxide resin and substantially immiscible with water. Preferably, one of such diluents is reactive with the polyepoxide resin and the other diluent is non-reactive with the polyepoxide resin. In other applications, it is preferred to use only a "reactive" diluent.

The substantially water immiscible reactive diluent used is preferably comprised of at least one member selected from the group consisting of butyl glycidyl ether, cresol glycidyl ether, allyl glycidyl ether, phenyl glycidyl ether, diglycidyl ether of 1,4-butanediol (butyl diglycidyl ether) and resorcinol (resorcinol diglycidyl ether), multi-functional (three or more reactive epoxide groups per molecule) diluents such as 2,6-diglycidyl phenyl glycidyl ether, trimethylol propane glycidyl ether and trimethylolethane triglycidyl ether, and other glycidyl ethers which are miscible with the epoxy resin utilized. Of these, butyl glycidyl ether, cresol glycidyl ether and trimethylolethane triglycidyl ether are the most preferred. The reactive diluent is preferably present in the general composition in an amount in the range of from about 2 to about 35 parts by weight per 100 parts by weight of the polyepoxide resin. More preferably, the reactive diluent is present in the general composition in an amount in the range of from about 15 to about 30 parts by weight, most preferably about 28 parts by weight, per 100 parts by weight of the polyepoxide resin. The reactive diluent reacts with the hardening agent and functions to reduce the viscosity of the polyepoxide resin.

The substantially water immiscible non-reactive diluent used is preferably selected from the group consisting of compounds having the structural formula:

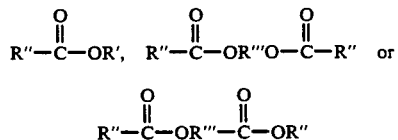

wherein R' is $C_nH_{2n+1}$ in which n is an integer in the range of from about to about 5; R', is $C_mH_{2m+1}$ wherein m is an integer in the range of from 1 to about 4, or R'' is

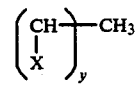

wherein y is an integer in the range of from 1 to about 4 and X is independently H or OH; and R''' is $C_aH_{2a}$ wherein a is an integer in the range of from 2 to about 5.

More preferably, the non-reactive diluent is selected from the group consisting of ethyl acetate, butyl lactate, ethyl lactate, amyl acetate, ethylene glycol diacetate and propylene glycol diacetate. Butyl lactate is the most preferred. The non-reactive diluent is preferably present in the general composition in an amount in the range of from about 4 to about 20 parts by weight per 100 parts by weight of the polyepoxide resin. More preferably, the non-reactive diluent is present in the general composition in an amount in the range of from about 8 to about 15 parts by weight, most preferably about 10 parts by weight, per 100 parts by weight of the polyepoxide resin. The non-reactive diluent helps lower the viscosity of the polyepoxide resin and facilitates the coating process.

Examples of other diluents that can be utilized in the general composition are methyl alcohol and other low molecular weight alkanols and tetrahydrofurfuryl methacrylate. It is often very convenient to use methanol as a diluent/solvent for various components used in the composition such as the polyepoxide resin and hardening agent and as a diluent in the composition.

The hardening agent of the general composition functions to react with the epoxide groups of the polyepoxide resin, in repeated steps, to form the final product. It is not merely a catalyst, but rather becomes part of the final product. Suitable hardening agents include amines, polyamines, amides and polyamides as known to those skilled in the art. Specific examples are described in U.S. Pat. No. 4,829,100 (previously incorporated by reference herein). These examples include methylene dianiline and liquid eutectic mixtures thereof with relatively small amounts of other amines. Examples of other suitable hardening agents include adducts formed by reacting an aliphatic amine with the condensation reaction product of epichlorohydrin and bisphenol A, and difunctional (two reactive amine groups per molecule) and multifunctional (three or more reactive amine groups per molecule) cycloaliphatic and aromatic amines as well as adducts of such amines with aromatic based epoxy or polyglycidyl aromatic ethers.

The hardening agent is preferably selected from the group of di-functional and multi-functional cycloaliphatic and aromatic amines and adducts of such amines with aromatic based epoxy or polyglycidyl aromatic ethers. More preferably, the hardening agent includes at least about 25% by weight of an amine hardening agent having three or more reactive aromatic amine groups per molecule. Mixtures of reaction products of aniline and formaldehyde including methylene dianiline (MDA), bis(para-aminobenzyl)aniline (BABA) and other isomers of the reaction of aniline and formaldehyde are very suitable. An example of such a hardening agent that is commercially available is marketed by Pacific Anchor Chemical of Air Products and Chemicals, Inc. under the trade designation "ANCAMINE DL-50". This hardening agent consists of approximately 63% b weight methylene dianiline and 37% by weight higher molecular weight oligomers of formaldehyde and aniline including trimers and quatramers of the reaction. Other suitable commercially available hardening agents include "TONOX 22" (from Uni-Royal Chemical) and "ANCAMINE DL-65" (from Pacific Anchor Chemical of Air Products and Chemicals, Inc.)

The hardening agent is employed in the general composition in an amount sufficient to achieve a stoichiometric or near stoichiometric reaction with the polyepoxide resin as known or readily available from chemical literature to those skilled in the art. The exact amount used depends on the particular components used as well as the reactivity thereof. For example, when a di-functional resin and a di-functional hardening agent are employed, the ratio of the amount of hardening agent to the amount of resin will be about 1:1.

Although the general composition can also include retarders or accelerators as hardening rate controllers to lengthen or shorten the working and cure times of the resin composition, they are generally not necessary. In fact, as discussed above, a primary object of the invention is the provision of a wetting aid for polyepoxide resin compositions that does not significantly accelerate the hardening rate of the resin. If they are necessary, suitable retarders include low molecular weight organic acid ester retarders such as alkyl esters of alkyl acids containing about 2 to 3 carbon atoms. Suitable accelerators include 2,4,6-tri(dimethylaminomethylene) phenol, the ethyl hexonate salt thereof and weak organic acids such as fumaric, erythorbic, ascorbic, salicylic and maleic acids. When a retarder or accelerator is utilized, it is generally combined with the general composition in an amount up to about 10 parts by weight per 100 parts by weight of the polyepoxide resin.

The general composition can be utilized in a variety of applications. For example, the composition can be used to securely bond threaded pipe sections together in pipe fitting applications. As shown by Example III below, the general composition forms a better bond between pipe sections than an identical composition not employing the wetting aid.

The general composition is particularly useful in oil and gas well completion and stimulation procedures to consolidate particulate material, either particulate material admixed with the general composition and introduced into a subterranean zone by way of the well bore or loose or incompetent particulate material (e.g., sand) contained within one or more subterranean formations penetrated by the well bore.

When used to consolidate particulate material, the general composition preferably also includes a resin to particulate material coupling agent to promote bonding of the resin to the particulate material. A preferred such coupling agent is N-$\beta$-(aminoethyl)-$\gamma$-aminopropyltrimethoxysilane. Such a coupling agent is marketed by Union Carbide Co. under the trade designation "Silane A-1120". The coupling agent is preferably included in the general composition in an amount in the range of from about 0.1 to about 3 parts by weight per 100 parts by weight of the polyepoxide resin.

As an example, a particularly preferred form of the general composition comprises an epoxy novolac resin formulation including at least about 30% by weight of multifunctional epoxy novolac resin ("EPI-REZ SU-2.5"), trimethylolethane triglycidyl ether present in an amount of about 16 parts by weight per 100 parts by weight of the resin, methanol present in an amount of about 12 parts by weight per 100 parts by weight of the resin, a hardening agent including at least about 35% by weight of reaction products of aniline and formaldehyde having three or more reactive aromatic amine groups per molecule ("ANCAMINE DL-50") present in an amount of about 26 parts by weight per 100 parts by weight of the resin, $\gamma$-aminopropyltrimethoxysilane ("Silane A-1120") present in an amount of about 2.0 parts by weight per 100 parts by weight of the resin, and the wetting aid (the inventive substituted alkoxy benzene) present in an amount of about 2.0 parts by weight per 100 parts by weight of the resin.

The above composition is particularly suitable for coating particulate material in gelled aqueous carrier liquids "on-the-fly" and consolidating the material into hard, permeable masses that have high strengths and hydrocarbon conductivities under hi9h temperature (i.e., >215° F.) and high pressure (e.g., 6,000 psi) conditions.

The use of multi-functional components in the composition, specifically a polyepoxide resin having three or more reactive epoxide groups per molecule, a substantially water immiscible reactive diluent having three or more reactive epoxide groups per molecule and an amine hardening agent having three or more reactive aromatic amine groups per molecule increases the glass transition temperature of the composition thereby increasing the high temperature performance of masses of particulate material consolidated therewith without affecting properties of the composition (e.g., viscosity and surface charge) that allow it to effectively coat particulate material in gelled aqueous carrier liquids "on-the-fly". A polyepoxide resin composition employing "multi-functional" components such as the above composition is disclosed by a co-pending U.S. patent application entitled "HIGH TEMPERATURE POLYEPOXIDE RESIN COMPOSITIONS AND METHOD FOR COATING PARTICULATE MATERIAL ON-THE-FLY", an application filed concurrently with this application in the names of B. Dewprashad, J. Weaver and J. Murphey and assigned to the same assignee to which this application is assigned, and which is hereby incorporated by reference herein.

The Specific Composition

The inventive specific composition for forming a hard permeable mass in a remote location (hereinafter "the specific composition") comprises an aqueous liquid, a hydratable gelling agent, particulate material, a resin composition that will subsequently harden for coating the particulate material and a surface active agent (in addition to the wetting agent employed in the resin composition) for further enhancing the ability of the resin composition to coat the particulate material.

The resin composition utilized in the specific composition is the general composition (including all embodiments thereof).

The aqueous liquid of the specific composition can be fresh water, brine or sea water.

The hydratable gelling agent of the specific composition preferably includes at least one hydratable polysaccharide, preferably a hydratable polysaccharide having a molecular weight in the range of from about 100,000 to 4,000,000, more preferably from about 600,000 to 2,400,000. Preferably, the polysaccharide is a cellulose or guar derivative. The polysaccharide preferably includes substituents such as hydroxyethyl substituents to give the necessary water hydration and gel characteristics to produce a clear aqueous gel having a viscosity of at least about 10 centipoises (reading on a Fann V.G. meter at 300 rpm). Examples of preferred polysaccharides include substituted carboxy and hydroxy alkyl cellulose, such as hydroxyethylcellulose and carboxymethylhydroxyethylcellulose, and substituted hydroxyalkylguar, such as hydroxypropylguar. Most preferably, the hydratable gelling agent of the specific composition is hydroxypropylguar having a molecular weight in the range of from about 100,000 to about 4,000,000, and having a propylene oxide substitution (M.S.) of about 0.1 to about 0.7 moles of propylene oxide per mole of mannose and galactose in the guar.

A gelled aqueous carrier liquid is formed upon hydration of the hydratable gelling agent in the aqueous liquid. The gelling agent is preferably present in the specific composition in an amount in the range of from about 20 to about 120 pounds per 1000 gallons of the aqueous liquid whereby the gelled aqueous carrier liquid formed has a viscosity in the range of from about 10 centipoises to about 400 centipoises. Most preferably, the gelling agent is present in the specific composition in an amount of from about 30 to about 80 pounds per 1000 gallons of the aqueous liquid whereby the gelled aqueous carrier liquid formed has a viscosity of from about 15 to about 100 centipoises. As is well understood by those skilled in the art, the gelled aqueous carrier liquid can be crosslinked to increase its viscosity and stability.

A gel breaker is preferably included in the specific composition to cause the gelled aqueous carrier liquid to revert to a relatively thin liquid at the time the resin coated particulate material reaches the location of the zone. The relatively thin liquid typically separates from the deposited particulate material and leaks off, for example, into permeable strata surrounding the deposit site. While a variety of gel breakers which are well known in the art can be utilized, an oxidative type of breaker such as sodium persulfate is preferred. Such a gel breaker is generally included in the composition in an amount in the range of from about 0.5 to about 50 pounds per 1000 gallons of aqueous liquid. The exact amount of gel breaker used depends upon the specific time period required between when the gel breaker is added and when the gel must be broken. Increases in the amount of gel breaker shorten such time period.

The particulate material used in the specific composition is preferably siliceous, silicate or alumino-silicate material or mixtures thereof. Such material includes ceramic, glass, and fiberglass material. The particulate material used is most preferably sand. The particle size of the sand is preferably in the range of from about 10 to about 70 mesh (U.S. Sieve Series). Preferably, the particulate material is present in the specific composition in an amount in the range of from about 2 to about 28 pounds, more preferably about 3 to about 22 pounds, per gallon of the aqueous liquid.

The resin composition (the inventive general composition) is preferably present in the specific composition in an amount in the range of from about 1 to about 20 pounds per 100 pounds of the particulate material. The resin composition coats the particulate material in the gelled aqueous carrier liquid.

The surface active agent for further enhancing the ability of the resin composition to coat the particulate material (hereinafter "the additional surface active agent") preferably includes one or more cationic surface active agents, one or more non-cationic surface active agents, or mixtures thereof. The cationic and non-cationic surface active agents produce a substantially instantaneous coating of the particulate material with the resin composition in the presence of the gelled aqueous carrier liquid. Preferably, a mixture of cationic and non-cationic surface active agents is utilized. As used herein, a non-cationic surface active agent includes a blend of anionic and non-ionic surface active agents.

Preferred cationic surface active agents include reaction products of an alcohol, epichlorohydrin and triethylenediamine wherein monohydric aliphatic alcohols having in the range of from about 12 to about 18 carbon atoms are reacted with from 2 to 3 moles of epichlorohydrin per mole of alcohol followed by reaction with an excess of triethylenediamine. The alcohol-epichlorohydrin reaction products contain ethoxylation chains having pendent chlorides. The subsequent reaction with triethylenediamine provides a cationic and a tertiary amine functionality to the resulting products.

The non-cationic surface active agents are preferably ethoxylated fatty acids produced by reacting fatty acids containing from about 12 to about 22 carbon atoms with from about 5 to about 20 moles of ethylene oxide per mole of acid, most preferably from about 6 to about 18 moles of ethylene oxide per mole of acid. A mixture of various quantities of ethoxylated acids and unreacted acids are produced.

When the gelling agent used is or includes a cellulose derivative of a polysaccharide polymer, the additional surface active agent is preferably a blend comprised of isopropyl alcohol, a preferred cationic surface active agent as described above and a preferred non-cationic surface active agent as described above wherein the weight ratio of cationic agent to non-cationic agent in the blend is in the range of from about 0.4 to 1, and preferably about 0.6 parts by weight cationic agent per 1 part by weight non-cationic agent and wherein the weight ratio of isopropyl alcohol to non-cationic agent in the blend is about 1 part by weight alcohol per 1 part by weight non-cationic agent.

When the gelling agent used is a galactomannan gum, the additional surface active agent is preferably a blend comprised of an alcohol, e.g., amyl alcohol, a preferred cationic surface active agent as described above and a preferred noncationic surface active agent as described above wherein the weight ratio of cationic agent to non-cationic agent in the blend is in the range of 0 to 1, and preferably about 0.2 parts by weight cationic agent per 1 part by weight noncationic agent and wherein the weight ratio of the alcohol to non-cationic agent in the blend is about i part by weight alcohol per 1 part by weight non-cationic agent.

The alcohol constituent of the above surface active agent blends functions as a solubilizer and diluent for the cationic and non-cationic surface active agents.

The additional surface active agent is preferably employed in the specific composition in an amount in the range of from about 0.25 to about 10 gallons per 1000 gallons of the aqueous liquid. When the gelling agent used is a cellulose derivative of a polysaccharide polymer, the additional surface active agent is preferably used in an amount of about 2 gallons per 1000 gallons of the aqueous liquid. When a galactomannan gum gelling agent is used, the additional surface active agent is preferably used in an amount of about 3 gallons per 1000 gallons of the aqueous liquid.

The components of the specific composition are preferably mixed together by first combining the aqueous liquid and gelling agent to form a gelled aqueous carrier liquid, and then adding the particulate material, general composition, and additional surface active agent employed thereto. The components can be batch mixed or continuously mixed "on-the-fly". Because the wetting agent enhances the ability of the polyepoxide resin composition to rapidly coat the particulate material, the specific composition is particularly suitable for mixture "on-the-fly". When the components are mixed together, the composition contains resin composition coated particulate material suspended in a gelled aqueous carrier liquid. The composition is transported to a remote location or zone wherein the resin coated particulate material is to be deposited and consolidated. For example, the composition can be pumped down a well bore into a zone penetrated thereby adjacent a hydrocarbon producing formation.

The surfaces of particulate material (e.g., sand) are typically negatively charged, easily water wetted and not attracted to polyepoxide resin. The inventive substituted alkoxy benzene is attracted to the particulate material and, because it is highly carbon-based, is also attracted to the polyepoxide resin thereby forming an attraction bridge between the two. It is believed that the amine groups of the substituted alkoxy benzene associate with the surfaces of the particulate material (particularly sand) making the surfaces more aromatic in character and more amenable to coating by the polyepoxide resin. Formation of the amine groups into ammonium salts further attracts the polyepoxide resin to the surface to the material being coated therewith. As shown by the Examples, although the "non-salt" forms of the inventive substituted alkoxy benzene cause a very slight acceleration of the polyepoxide curing reaction, the increase is not significant.

The Method

In accordance with the inventive method of continuously forming and suspending consolidatible resin composition coated particulate material in a gelled aqueous carrier liquid, the inventive specific composition (including all embodiments thereof) is continuously formed and transported to a remote location on a substantially instantaneous and continuous basis. The composition can be continuously introduced to a remote location, e.g., a subterranean formation, over an extended period of time.

A gelled aqueous carrier liquid is prepared in a storage container by combining the hydratable gelling agent with the aqueous liquid. The resin composition (the inventive general composition) is prepared in a separate container by mixing the polyepoxide resin with the substantially water immiscible diluent or diluents used, hardening agent, wetting aid and other components used.

Continuous streams of the gelled aqueous carrier liquid, uncoated particulate material, the resin composition, the additional surface active agent, the liquid gel breaker and any other components utilized are conducted to a continuous mixing apparatus wherein they are mixed and a gelled aqueous carrier liquid having resin composition coated particulate material suspended therein is formed. The composition is continuously pumped from the mixing apparatus to the remote location where the resin coated particulate material is to be deposited and consolidated into a hard permeable mass, e.g., to a subterranean zone penetrated by a well bore. As is well understood by those skilled in the art, the zone may first be conditioned by preflushing with a suitable conditioning liquid and/or after flushes may be used to insure uniform placement, consolidation and maximum permeability of the deposited resin coated particulate material.

In order to further illustrate the compositions and method of the present invention, the following examples are given.

EXAMPLE I

Various samples of the inventive substituted alkoxy benzene were prepared. Each sample was prepared using the same general procedure.

Samples of the first embodiment of the inventive substituted alkoxy benzene were first prepared. In a typical synthesis, approximately 40 grams (0.15 moles) of 2,4,6-tri(dimethylaminomethylene) phenol were dissolved in 200 milliliters of distilled water. The resulting solution was treated with 6.7 grams (0.168 moles) of sodium hydroxide and stirred for three hours to form a phenoxide. Next, an alkyl halide was slowly added to the solution (e.g., over a 30 minute period) and the solution was stirred overnight. Organic layers containing the inventive substituted alkoxy benzene were then extracted from the solution in several steps using a total of approximately 200 milliliters of methylene chloride as the extraction solvent. The organic layers were combined and dried with sodium sulfate. Additional solvent was then removed from the organic layers by vacuum distillation.

In a first sample, the alkyl halide used was methyl iodide. Approximately 10.5 milliliters (0.169 moles) of methyl iodide were added to the phenoxide solution. Upon removing the additional solvent from the extracted product, a reddish liquid was formed. Using NMR spectroscopy techniques, it was determined that the liquid consisted of approximately 90–95% by weight 2,4,6-tris(dimethylaminomethylene)methoxybenzene.

In a second sample, the alkyl halide used was 1,2-dichloroethene. Approximately 5.3 grams (0.055 moles) of 1,2-dichloroethene were added to the phenoxide solution. Upon removing the additional solvent from the extracted product, a golden yellow liquid was formed. Using NMR spectroscopy techniques, it was determined that this liquid consisted of approximately 95% by weight 1,2-[2,4,6-tris(dimethylaminomethylene)benzene]ethene.

In a third sample, the alkyl halide used was 1,4-dibromobutane. Approximately 6.99 grams (0.055 moles) of 1,4-dibromobutane were added to the phenoxide solution. Upon removing the additional solvent from the extraction product, a yellow liquid was formed. It was determined using NMR spectroscopy techniques that this liquid consisted of approximately 95% by weight 1,4-di[2,4,6-tris(dimethylaminomethylene)benzene] butane.

Samples of the second embodiment of the inventive substituted alkoxy benzene were then prepared. In a typical synthesis, a solution of 6.7 grams (0.168 moles) of sodium hydroxide in 35 milliliters of methanol were added to about 40 grams (0.15 moles) of 2,4,6-tri(dimethylaminomethylene)phenol to form a phenoxide solution. The resulting solution was then treated slowly with an alkyl halide. An equimolar amount of the alkyl halide to form the compound into a phenyl ether (an alkoxy benzene) was added first. After stirring for several hours, a three molar amount of a second alkyl halide to form the compound into a trisammonium salt was added (if the two alkyl halides were the same compound, four molar amounts were added simultaneously). After stirring for several hours, the reaction mixture was filtered to afford a golden yellow liquid.

In a first sample, acetyl chloride was used to form the phenyl ether and methyl chloride was used to form the trisammonium salt. Approximately 12 grams (0.15 moles) of acetyl chloride were first added to the phenoxide solution. After stirring, approximately 23 grams (0.46 moles) of methyl chloride were added to form the compound into 2,4,6-tris(trimethylammoniummethylene)-1-benzyloxybenzene.

In a second sample, benzyl chloride was used to form both the phenyl ether and the trisammonium salt. Approximately 85 grams (0.672 moles) of benzyl chloride were added to the phenoxide solution and stirred for several hours to form the compound into 2,4,6-tris(benzyldimethylammoniummethylene)-1-benzyloxybenzene.

In a third sample, acetyl chloride was used to form the phenyl ether and benzyl chloride was used to form the trisammonium salt. Approximately 12 grams (0.15 moles) of acetyl chloride were first added to the phenoxide solution. After stirring, approximately 57 grams (0.45 moles) of benzyl chloride were added to form the compound into 2,4,6-tris(benzyldimethylammoniummethylene)-1-acetoxybenzene.

EXAMPLE II

Next, the various samples of the first embodiment of the inventive substituted alkoxy benzene formed in Example I were tested for their effectiveness in enhancing the ability of a polyepoxide resin composition to coat and bond to particulate material in high temperature applications without significantly accelerating the curing rate of the resin.

Cure Acceleration Tests

Each sample was first tested to see how it affected the curing rate of a polyepoxide resin composition. The tests were carried out by analyzing the exothermic properties of polyepoxide resin compositions (including the samples of the inventive substituted alkoxy benzene) as the resin in the compositions cured. The exothermic properties of a control resin composition (not including the inventive substituted alkoxy benzene) and a comparative resin composition (including another type of compound) as the resin in the compositions cured were also analyzed. The temperatures of the compositions with respect to time as the resin cured are indicative of the curing reaction rates.

The polyepoxide resin compositions used were of a type typically used in consolidating particulate material into hard, permeable masses. The general procedure used to carry out the tests was as follows:

The compositions employing the samples of the inventive substituted alkoxy benzene were prepared by first combining approximately 33.4 grams (100 parts by weight) of a polyepoxide resin (the diglycidyl ether of bisphenol A) ("EPON 828 ™"), approximately 4.1 grams (12 parts by weight) of a first diluent (butyl glycidyl ether), 2.5 milliliters (2.44 grams) (7 parts by weight) of a second diluent (butyl lactate) and 0.25 milliliters (0.25 grams) (0.7 parts by weight) of a coupling agent (aminoethylaminopropyltrimethoxysilane) and stirring the admixture for approximately 15 minutes. Next, approximately 2.5 milliliters (2.46 grams) (7 parts by weight) of the sample of the inventive substituted alkoxy benzene being tested and 14 milliliters (15.12 grams) (45 parts by weight) of a hardening agent (consisting of about 75% by weight methylene dianiline and various oligomers thereof and 25% by weight of a solvent (methanol)) ("TONOX 22") were added to the mixture and the mixture was stirred for a few minutes.

The control and comparative compositions were then prepared in the same way. The control composition contained the polyepoxide resin, first diluent, second diluent, coupling agent and hardening agent as described above while the comparative composition contained the control composition plus approximately 1.35 milliliters (1.31 grams) (4 parts by weight) of 2,4,6-tri(dimethylaminomethylene) phenol.

Each composition was then placed in a well insulated container and the temperature of the composition was measured with respect to time.

The temperature of the control composition reached 82° F. after 2 hours. The temperature of the comparative composition reached 246° F. after two hours indicating that significant acceleration of the epoxy resin composition was caused by the 2,4,6-tri(dimethylaminomethylene) phenol. Two compositions employing the first sample of the first embodiment of the inventive substituted alkoxy benzene (formed using methyl iodide) had peak exotherms of 104° F. and 102° F., respectively, after two hours. A composition employing the second sample of the first embodiment of the inventive substituted alkoxy benzene (formed using 1,2-dichloroethene) had a peak exotherm of 128° F. at 1.2 hours and an exotherm of 84° F. after two hours. A composition employing the third sample of the first embodiment of the inventive substituted alkoxy benzene (formed using 1,4-dibromobutane) had a peak exotherm of 84° F. after two hours. It is not clear what caused the somewhat higher exotherms of the compositions employing the inventive substituted alkoxy benzene. It is believed that the increase may be due to the nitrogen groups present and possibly unreacted phenol in the wetting aid. In any event, any increases in the curing reaction rate caused by the inventive substituted alkoxy benzene samples were not significant.

Compressive Strength Tests

Next, the compressive strengths of sand cores consolidated with polyepoxide resin compositions employing the inventive substituted alkoxy benzene samples were analyzed and compared to similar sand cores consolidated with polyepoxide resin compositions not employing the inventive substituted alkoxy benzene. The compressive strengths of the cores are representative of the degree to which the corresponding polyepoxide resin compositions coated the sand.

First, polyepoxide resin compositions employing the inventive substituted alkoxy benzene samples were prepared. Each composition was prepared using the following general procedure:

Approximately 33.4 grams (100 parts by weight) of a polyepoxide resin (the diglycidyl ether of bisphenol A) ("EPON 828 TM"), 4.1 grams (12 parts by weight) of a first diluent (butyl glycidyl ether), 2.5 milliliters (2.46 grams) (7 parts by weight) of a second diluent (butyl lactate) and 0.5 milliliters (0.7 grams) (2 parts by weight) of a silane coupling agent ("Silane A-1120 TM") were combined and stirred for approximately 15 minutes. The sample of the inventive substituted alkoxy benzene to be tested and approximately 14 milliliters (15.12 grams) (45 parts by weight) of a hardening agent (consisting of about 75% by weight methylene dianiline and various oligomers thereof and 25% by weight of a diluent (methanol)) ("TONOX 22") were added to the mixture and the mixture was stirred for an additional 15 minutes. The amount of the inventive substituted alkoxy benzene added to the mixture varied.

Control compositions consisting of the resin, first diluent, second diluent, coupling agent and hardening agent were prepared in the same way.

Next, hard, permeable sand cores consolidated with the resin compositions were formed. Each core was formed using the following general procedure:

A slurry of sand suspended in a gelled aqueous carrier liquid ("the gel") was first prepared. The gel was prepared by hydrating approximately 0.13 grams of a polysaccharide polymer gelling agent (hydroxypropylguar (0.39 M.S.)) in 250 milliliters of a 2% by weight potassium chloride solution. Approximately 0.15 milliliters of a blend of surface active agents comprising approximately 18% by weight cocobetaine, 25% by weight isopropanol, 29% by weight water, 10% by weight of a mixed ethoxylated (7 moles E.O.) phenol formaldehyde compound, and 18% by weight isoamyl alcohol was added to the gel. The gel was stirred until well mixed. Thereafter, approximately 240 grams of resieved sand, 20/40 mesh, were added to the gel and the mixture was stirred.

As the slurry was stirred, approximately 5 milliliters of the resin composition being tested were then added thereto. After about 1 minute of continued stirring, approximately 1 milliliter of a gel breaker (a 6% by weight solution of a enzymatic breaker) was added to the slurry and the slurry was stirred for an additional minute. Thereafter, the slurry was allowed to sit for several minutes and the gel was decanted which resulted in a mixture of the sand and resin composition.

Next, the sand/resin composition mixture was placed into one or more glass tubes coated with a mold release agent and stopper at one end. The resin coated sand in each tube was tamped down, clamped under mechanical pressure and allowed to cure in a constant temperature bath at approximately 210° F. for 24 hours. After the 24 hour period, the glass tube(s) were slowly cooled to room temperature. Consolidated cores had formed in each tube. The consolidated cores were then removed from the tubes and cut into sections.

Using a Tinus-Olsen press, an increasing compressive load was then placed on each core section until the section crushed. The compressive load at the failure point of the core section was measured and the pressure was calculated from the load. The results of the test were shown in Table I below.

TABLE I

| Inventive Substituted Alkoxy Benzene | Compressive Strength Tests | | |
|---|---|---|---|
| | Concentration[1] | Compressive Strength (psi) | Control[3] (psi) |
| First Sample[4] | 1.0 | 564 | 454 |
| | 1.0 | 833 | 454 |
| | 2 | 2106 | 1303 |
| | 2 | 1386 | 454 |
| | 2 | 1374 | 454 |
| | 2 | 1386 | 454 |
| | 2 | 1503 | 454 |
| | 4 | 1628 | 1303 |
| | 8 | 1093 | 1303 |
| Second Sample[5] | 8 | 1002 | 388 |
| | 8 | 988 | 388 |
| Third Sample[6] | 8 | 457 | 388 |

[1]Parts by weight of the wetting aid per 100 parts by weight of the polyepoxide resin (the diglycidyl ether of bisphenol A).
[2]The average compressive strength of consolidated core sections (including the inventive wetting aid).
[3]The average compressive strength of control consolidated core sections (not including the inventive wetting aid).
[4]2,4,6-tris(dimethylaminomethylene)methoxybenzene, formed using methyl iodide.
[5]1,2-di[2,4,6-tris(dimethylaminomethylene)benzene]ethene, formed using 1,2-dichloroethene.
[6]1,4-di[2,4,6-tris(dimethylaminomethylene)benzene]butane, formed using 1,4-dibromobutane.

Table I shows that the various samples of the inventive substituted alkoxy benzene tested improved the compressive strength of the consolidated sand cores. The optimum concentration of the 2,4,6-tris(dimethylaminomethylene)methoxybenzene was 2 parts per weight per 100 parts by weight of the polyepoxide resin. Use of 2 parts by weight 2,4,6-tris(dimethylaminomethylene)methoxybenzene per 100 parts by weight of the resin resulted in a three-fold increase in compressive strength. The 1,2-di[2,4,6-tris(dimethylaminomethylene)benzene] ethene showed a two to three-fold increase in compressive strength at a concentration of 8 parts by weight per 100 parts by weight of the resin composition.

EXAMPLE III

The inventive substituted alkoxy benzene was tested for its effectiveness in enhancing the ability of a polyepoxide resin composition to bond threaded pipe sections together. The inventive substituted alkoxy benzene tested was 2,4,6-tris(benzyldimethylammoniummethylene)-1-benzyloxybenzene having the structural formula:

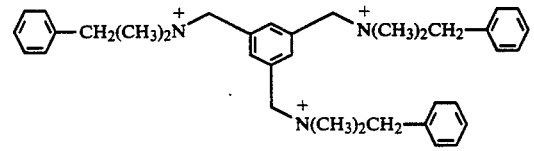

The 2,4,6-tris(benzyldimethylammoniummethylene)-1-benzyloxybenzene was prepared in accordance with the general procedure used to prepare the 2,4,6-tris(benzyldimethylammoniummethylene)-1-benzyloxybenzene described in Example I.

A polyepoxide resin composition containing the 2,4,6-tris(benzyldimethylammoniummethylene)-1-benzyloxybenzene was then prepared. Approximately 20.19 grams of a mixture of bisphenol A epoxy resin, a diglycidyl ether diluent, aluminum and calcium carbonate (a suspension aid) were combined with approximately 0.82 grams of tetraethylenepentaamine (TEPA) (a hardening agent) and 1.04 grams of the 2,4,6-tris(benzyldimethylammoniummethylene)-1-benzyloxybenzene.

A control composition containing the polyepoxide resin, diluent, aluminum, calcium carbonate and hardening agent as described above was then prepared in the same way.

The threads of a large bolt and corresponding nut were then coated with the polyepoxide resin composition containing the inventive substituted alkoxy benzene. The bolt and nut were fitted together and allowed to sit until the epoxy wa cured. A second large bolt and corresponding nut were then treated in the same manner with the control composition.

The force to remove each nut from the corresponding bolt was measured with a torque wrench. The nut treated with the polyepoxide resin composition containing the inventive substituted alkoxy benzene required approximately 108 ft.-lbs. (average maximum) while the nut treated with the control composition required approximately 105 ft.-lbs. (average maximum). The characteristics of the nut removal process were significantly different in each case. The nut treated with the polyepoxide resin composition employing the inventive substituted alkoxy benzene did not break loose cleanly and required the full maximum torque almost all the way during the nut removal. On the other hand, the nut treated with the control composition broke cleanly and was easily removed after it broke.

EXAMPLE IV

The inventive substituted alkoxy benzene was further tested for its effectiveness in enhancing the ability of a polyethylene resin composition to coat particulate material at high temperatures (210° F.). The following samples of the inventive substituted alkoxy benzene were tested:

| Sample | Name | Formula |
|---|---|---|
| A | 2,4,6-tris(dimethylaminomethylene)-1-methoxybenzene | $OCH_3$ substituent at position 1; $(CH_3)_2NCH_2-$ groups at positions 2, 4, 6 |
| B | 2,4,6-tris(dimethylaminomethylene)-1-benzyloxybenzene | $OCH_2C_6H_5$ substituent at position 1; $(CH_3)_2NCH_2-$ groups at positions 2, 4, 6 |
| C | 2,4,6-tris(dimethylaminomethylene)-1-acetoxybenzene | $OCOCH_3$ substituent at position 1; $(CH_3)_2NCH_2-$ groups at positions 2, 4, 6 |
| D | 2,4,6-tris(trimethylammoniummethylene)-1-acetoxybenzene | $OCOCH_3$ substituent at position 1; $(CH_3)_3N^+CH_2-$ groups at positions 2, 4, 6 |

-continued

| Sample | Name | Formula |
|---|---|---|
| E | 2,4,6-tris(benzyldimethyl-ammoniummethylene)-1-benzyloxybenzene | (structure) |
| F | 2,4,6-tris(benzyldimethylammonium-methylene)-1-acetoxybenzene | (structure) |

Preparation of the Samples

Samples A–C were prepared in accordance with the general procedure used to prepare the samples of the first embodiment of the inventive substituted alkoxy benzene described in Example I. Samples D–F were prepared in accordance with the general procedure used to prepare the samples of the second embodiment of the inventive substituted alkoxy benzene described in Example I.

In preparing Sample A, the alkyl halide added to the phenoxide solution formed by reacting 2,4,6-tri(dimethylaminomethylene) phenol with sodium hydroxide was methyl iodide. In preparing Sample B, the alkyl halide added to the phenoxide solution was benzyl chloride. In preparing Samples C, D and F, the alkyl halide added to the phenoxide solution was acetyl chloride. After reacting the phenoxide compound with the acetyl chloride, Sample D was further reacted with methyl iodide to form the sample into a tris-methyl ammonium salt. Sample F was further reacted with benzyl chloride to form the sample into a tris-benzyl ammonium salt. In Sample E, the reactions forming the "alkoxy" and "trisammonium salt" portions of the compound were performed concomitantly using benzyl chloride.

Cure Acceleration Tests

Next, exotherm tests were carried out on polyepoxide resin compositions containing the samples to see how the samples affected the curing rate of the resins. The resin compositions were prepared in the same manner as the resin compositions used in the exotherm tests described in Example II were prepared. A control composition as described in Example II was also prepared. The exotherm tests were then carried out in accordance with the procedure described in Example II.

Each resin composition with the inventive substituted alkoxy benzene present had an exotherm substantially similar to the exotherm of the control composition. Thus, the inventive substituted alkoxy benzene did not significantly accelerate the curing rates of the resin in the compositions. Samples A, B and C had slightly higher exotherms than Samples D, E and F.

The Compressive Strength Tests

Next, compressive strength tests were carried out on consolidated sand cores formed using polyepoxide resin compositions containing the above samples of the inventive substituted alkoxy benzene and on corresponding cores formed using polyepoxide resin compositions not containing the inventive substituted alkoxy benzene.

The polyepoxide resin compositions and slurries of sand were formed and combined, and the compressive strength tests were carried out, in accordance with the same general procedures described in Example II.

The results of the tests are shown in Table II below:

TABLE II

Compressive Strength Tests

| Sample | Concentration[1] | Compressive Strength[2] (psi) | Control[3] (psi) | Relative Enhancement[4] |
|---|---|---|---|---|
| A[5] | 8 | 1036 | 873.25 | 120% |
| B[6] | 3 | 2888 | 1729.5 | 170% |
|  | 6 | 1790.5 | 559 | 320% |
|  | 8 | 2303.25 | 873.25 | 260% |
| C[7] | 3 | 2955 | 2105 | 140% |
|  | 4.5 | 2123 | 1789.5 | 120% |
|  | 6 | 2851 | 1789.5 | 160% |
|  | 8 | 2731 | 1789.5 | 150% |
| D[8] | 3 | 2453.5 | 1729.5 | 140% |
|  | 6 | 1958.5 | 559 | 350% |
|  | 8 | 1295.5 | 504.5 | 260% |
| E[9] | 3 | 2169 | 1575 | 140% |
|  | 6 | 2508.5 | 1575 | 160% |
|  | 9 | 2104.5 | 1575 | 130% |
| F[10] | 6 | 2380.5 | 559 | 430% |
|  | 8 | 1576.5 | 504.5 | 310% |

TABLE II-continued

Compressive Strength Tests

| Sample | Concentration[1] | Compressive Strength[2] (psi) | Control[3] (psi) | Relative Enhancement[4] |
|---|---|---|---|---|
| | 9 | 169 | 151 | 112% |

[1] Parts by weight of the sample substituted alkoxy benzene per 100 parts by weight of the polyepoxide resin (the diglycidyl ether of bisphenol A).
[2] The average compressive strength of consolidated core sections (substituted alkoxy benzene included).
[3] The average compressive strength of control consolidated core sections (substituted alkoxy benzene not included).
[4] The increase in performance calculated by dividing the average compressive strength of the core sections formed using the inventive substituted alkoxy benzene by the average compressive strength of the corresponding control core sections and multiplying the product by 100.
[5] 2,4,6-tris(dimethylaminomethylene)-1-methoxybenzene
[6] 2,4,6-tris(dimethylaminomethylene)-1-benzyloxybenzene
[7] 2,4,6-tris(dimethylaminomethylene)-1-acetoxybenzene
[8] 2,4,6-tris(trimethylammoniummethylene)-1-acetoxybenzene
[9] 2,4,6-tris(benzyldimethylammoniummethylene)-1-benzyloxybenzene
[10] 2,4,6-tris(benzyldimethylammoniummethylene)-1-acetoxybenzene The tests demonstrated that all of the samples of the inventive substituted alkoxy benzene tested enhanced the ability of the polyepoxide resin to coat and bond to the sand. The greatest enhancement was seen with the tris-ammonium salts, Samples D, E and F. The 2,4,6-tris(benzyldimethylammoniummethylene)-1-acetoxybenzene, Sample F, performed best while the 2,4,6-tris(-dimethylaminomethylene)-1-methoxybenzene, Sample A, showed the least amount of enhancement. It is important to note all the samples of the inventive substituted alkoxy benzene enhanced the ability of the resin composition to coat and bond to the sand at 210° F., a relatively high temperature.

EXAMPLE V

The shear bond strengths of a mass of sand consolidated with a polyepoxide resin composition employing a sample of the inventive substituted alkoxy benzene and a mass of sand consolidated with a control polyepoxide resin composition were measured and compared. The sample of the inventive substituted alkoxy benzene used was Sample E as described in Example IV above.

A polyepoxide resin composition employing the 2,4,6-tris(benzyldimethylammoniummethylene)-1-benzyloxybenzene was prepared in accordance with the same general procedure used to prepare the polyepoxide resin compositions used in the compressive strength tests described in Example II above. The 2,4,6-tris(benzyldimethylammoniummethylene)-1-benzyloxybenzene was employed in an amount of 4 parts by weight per 100 parts by weight of the polyepoxide resin. A control polyepoxide resin composition consisting of the same resin, coupling agent and hardening agent but not a substituted alkoxy benzene was prepared in the same way.

Next, slurries of sand containing the polyepoxide resin compositions were prepared in accordance with the general procedure used to prepare the sand slurries described in Example II. Instead of placing the sand/resin composition mixtures into glass tubes and forming the mixtures into cores, however, the sand/resin composition mixtures were placed in between two concentric metal sleeves, an inner metal sleeve and an outer metal sleeve. The sand/resin composition mixtures were then allowed to cure at room temperature for 24 hours.

The metal sleeve devices were then mounted into an apparatus which held the outer metal sleeve in place and allowed the inner metal sleeve to move. The force (shear bond strength) required to push each inner sleeve out was measured.

The shear bond strength required to push the inner sleeve used with the polyepoxide resin composition employing the 2,4,6-tris(benzyldimethylammoniummethylene)-1-benzyloxybenzene out was 10.0 psi whereas the shear bond strength required to push the inner sleeve used with the control polyepoxide resin composition out was 3.4 psi. Thus, by employing the inventive substituted alkoxy benzene, a 295% enhancement in the shear bond strength of the polyepoxide resin composition was achieved. Further, the characteristics of the inner sleeve movement in each test were significantly different. The device used with the control polyepoxide resin composition broke loose cleanly and the inner metal sleeve was easily removed. On the other hand, the device used with the polyepoxide resin composition employing the 2,4,6-tris(benzyldimethylammoniummethylene)-1-benzyloxybenzene required a greater amount of force during substantially all of the time required to remove the inner metal sleeve.

EXAMPLE VI

Tests were carried out to demonstrate the ability of the inventive substituted alkoxy benzene to enhance the ability of a polyepoxide resin composition to coat particulate material when the coating is performed in a very rapid basis. The compressive strengths of sand cores consolidated with polyepoxide resin composition samples (employing samples of the inventive substituted alkoxy benzene) using various coating times (15 seconds versus 5 minutes) were analyzed and compared to the compressive strengths of sand cores consolidated with polyepoxide resin composition samples (not employing the inventive substituted alkoxy benzene) using the same coating The formulation of the polyepoxide resin composition used in the tests was as follows:

(a) 85 grams of an epoxy novolac resin formulation including at least about 30% by weight of a multifunctional epoxy novolac resin ("EPI-REZ SU-2.5");

(b) 16.5 grams of trimethylolethane triglycidyl ether, a multi-functional reactive diluent (marketed by Rhone Poulenc Corp. under the trade designation "HELOXY 5044");

(c) 10 cubic centimeters of methanol;

(d) 2 cubic centimeters of γ-aminopropylaminotrimethoxy silane, a coupling agent ("Silane A-1120");

(e) 30.6 grams of a hardening agent consisting of approximately 63% by weight methylene dianiline and 37% by weight higher molecular weight oligomers of aniline and formaldehyde including trimers and quatramers of the reaction ("ANCAMINE DL-50"); and (f) 12.5 grams of methanol.

The samples of the inventive substituted alkoxy benzene tested were 2,4,6-tris(benzyldimethylammoniummethylene)benzyloxybenzene and 2,4,6-tris(trimethylammoniummethylene)acetoxybenzene, Samples E and D, respectively, as described in Example IV above. When tested, each of these compounds was added to the corresponding polyepoxide resin composition sample in an amount of 1 cubic centimeter.

The 2,4,6-tris(benzyldimethylammoniummethylene)-benzyloxybenzene was tested first. Hard, permeable sand cores consolidated with samples of the polyepoxide resin composition employing the 2,4,6-tris(benzyldimethylammoniummethylene)benzyloxybenzene and samples of the polyepoxide resin composition not employing a substituted alkoxy benzene (control samples) were prepared. Each core was formed using the following general procedure.

A slurry of sand suspended in a gelled aqueous carrier liquid ("the gel") was first prepared. The formulation of the gel was as follows:
 (a) 1 liter tap water;
 (b) 20 grams sodium chloride;
 (c) 1 cubic centimeter of a tetramethyl ammonium chloride solution; and
 (d) 10 cubic centimeters of a diesel oil dispersion of a guar gelling agent.

Approximately 3 cubic centimeters of a blend of surface active agents comprising approximately 18% by weight cocobetaine, 25% by weight isopropanol, 29% by weight water, 10% by weight of a mixed ethoxylated (7 moles E. O.) phenol formaldehyde compound and 18% by weight isoamyl alcohol were added to the gel. The gel was stirred until well mixed.

Thereafter, approximately 600 grams of resieved sand, 20/40 mesh Ottawa frac sand, were added to 600 cubic centimeters of the gel and the resulting slurry was stirred. As the slurry was stirred, 19.5 cubic centimeters (0.375 gal/sack) of the polyepoxide resin composition sample being tested were added thereto. The slurry was then stirred for the desired coating time, either 15 seconds or 5 minutes. The slurry was maintained at room temperature (72° F.) during the coating process. After the desired coating time, the slurry was allowed to sit for several minutes and the gel was decanted which resulted in a mixture of the sand and resin composition.

Next, the sand/resin composition mixture was divided into numerous test samples. Each test sample was placed in a glass tube coated with a mole release agent and stopper at one end. The resin coated sand in each tube was tamped down and allowed to cure in an autoclave for 20 hours at a specific curing temperature, either 180° F. or 275° F. Sets of four test samples were run at each temperature. After the 20 hour cure period, the glass tubes were slowly cooled to room temperature. Consolidated cores had formed in each tube. The consolidated cores were then removed from the tubes and cut into sections.

Each consolidated core section was tested as follows:
Using a Tinus-Olsen press, an increasing compressive load was placed on the core section until the section crushed. The compressive load at the failure point of the section was measured and the presence calculated from the load.

The results of the tests of the 2,4,6-tris(benzyldimethylammoniummethylene)benzyloxybenzene are shown in Table III below.

TABLE III

| Compressive Strengths of Consolidated Sand Cores Formed Using Varying Coating Times | | | |
|---|---|---|---|
| Wetting Aid[1] | Coating Time[2] (Sec.) | Cure Temp.[3] (°F.) | Compressive Strength[4] (psi) |
| Employed | 15 | 180 | 2346 |
| Not Employed | 15 | 180 | 1062 |
| Employed | 300 | 180 | 3099 |
| Not Employed | 300 | 180 | 2928 |
| Employed | 15 | 275 | 3733 |
| Not Employed | 15 | 275 | 1986 |
| Employed | 300 | 275 | 3579 |

TABLE III-continued

| Compressive Strengths of Consolidated Sand Cores Formed Using Varying Coating Times | | | |
|---|---|---|---|
| Wetting Aid[1] | Coating Time[2] (Sec.) | Cure Temp.[3] (°F.) | Compressive Strength[4] (psi) |
| Not Employed | 300 | 275 | 4020 |

[1]When employed, the wetting aid used in the polyepoxide resin composition samples was 2,4,6-tris(benzyldimethylammoniummethylene)benzyloxybenzene.
[2]The time that an aqueous gel containing the sand was stirred after the polyepoxide resin composition sample being tested was added thereto.
[3]The temperature at which the sand/resin composition mixture forming the consolidated sand core was allowed to cure.
[4]Calculated from the compressive load at the failure point of the core section.

Next, the 2,4,6-tris(trimethylammoniummethylene)acetoxybenzene was tested in the same way except that instead of testing samples cured at both 180° F. and 275° F., only samples cured at 275° F. were tested. The results of the tests are shown in Table IV below.

TABLE IV

| Compressive Strengths of Consolidated Sand Cores Formed Using Varying Coating Times | | |
|---|---|---|
| Wetting Aid[1] | Coating Time[2] (Sec.) | Compressive Strength[3] (psi) |
| Employed | 15 | 1815 |
| Employed | 15 | 1610 |
| Not Employed | 15 | 582 |
| Not Employed | 15 | 651 |
| Employed | 300 | 2397 |
| Employed | 300 | 1918 |
| Not Employed | 300 | 1781 |
| Not Employed | 300 | 1849 |

[1]When employed, the wetting aid used in the polyepoxide resin composition samples was 2,4,6-tris(benzyldimethylammoniummethylene)acetoxybenzene.
[2]The time that an aqueous gel containing the sand was stirred after the polyepoxide resin composition sample being tested was added thereto.
[3]Calculated from the compressive load at the failure point of the core section.

The results of the tests show that the inventive substituted alkoxy benzene greatly improves the ability of a "multi-functional" polyepoxide resin composition to coat particulate material on a very rapid basis.

EXAMPLE VII

A fracture stimulation treatment was run on an oil and gas well in the Williston Basin in North Dakota. The well had a depth of about 9,450 feet, a bottom hole static temperature of about 220° F., a bottom hole pressure of about 1500 psi and a final fracture closure pressure estimated to be about 4900 psi.

Due to problematic proppant flowback experienced with fracture stimulation treatments carried out on similar wells, it was decided to add a polyepoxide resin composition to the proppant during the last portion of the fracturing treatment. The polyepoxide resin composition used employed the inventive substituted alkoxy benzene as a wetting aid. The particular substituted alkoxy benzene utilized was 2,4,6-tris(benzyldimethylammoniummethylene)benzyloxybenzene.

In carrying out the treatment, 10,000 gallons of a "breakdown acid", a 15% by weight hydrochloric acid solution, were first added to the well. Thereafter, 10,000 gallons of a first gel (Gel Formulation A) were added to the well.

Next, 20,000 gallons of a second gel (Gel Formulation B) were added to the well together with a 70/170 mesh sand (U.S. Sieve Series). The 70/170 mesh sand was used in an amount of one pound per gallon of the Gel Formulation B used in this step. An additional 15,000 gallons of Gel Formulation B were then added to the well.

Next, 20,000 gallons of Gel Formulation B were added to the well together with 20/40 Ottawa frac sand (U.S. Sieve Series). The initial ratio of the 20/40 frac sand to the gel used in this step was one pound per gallon of the gel. The ratio of the 20/40 frac sand to the gel used in this step was gradually increased to 3 pounds per gallon of the gel.

Next, 28,000 gallons of Gel Formulation B were added to the well with increasing amounts of 20/40 mesh frac sand. The ratio of the 20/40 mesh frac sand to the gel used in this step was ultimately increased to 6 pounds per gallon of the gel.

Next, 4,600 gallons of Gel Formulation B were added to the well together with 20/40 mesh frac sand, a surface active agent, the polyepoxide resin composition, an enzyme gel breaker and a sodium persulfate gel breaker. The 20/40 mesh frac sand was used in an amount of 6 pounds per gallon of the gel. The surface active agent was used in an amount of 3 gallons per 1000 gallons of the gel. The polyepoxide resin composition was used in an amount of 1.5 gallons per 1000 gallons of the gel. The enzyme gel breaker was used in an amount of 2 pounds per 1000 gallons of the gel. The sodium persulfate gel breaker was used in an amount of 5 pounds per 1000 gallons of the gel.

Gel Formulation A was a borate crosslinked gel consisting of water, 2 gallons of a tetramethyl ammonium chloride solution per 1000 gallons of the water, 25 pounds of sodium chloride per 1000 gallons of the water and 15 pounds of a base guar gelling agent per 1000 gallons of the water together with sufficient buffer to adjust the pH to 9.5 and 0.5 pounds of sodium borate per 1000 gallons of the water.

Gel Formulation B was the same as Gel Formulation A except that 35 pounds of the guar gelling agent were used per 1000 gallons of the water with a proportionately greater amount of sodium borate.

The surface active agent was a surface active agent blend consisting of 18% by weight cocobetaine, 10% by weight of an ethoxylated phenol formaldehyde compound, 25% by weight isopropanol, 18% by weight isoamyl alcohol and 29% by weight water.

The polyepoxide resin composition was prepared as follows:

A first composition mixture consisting of 5.25 gallons of methanol, 7 gallons of trimethylolethane triglycidyl ether (a multi-functional reactive diluent), 40 gallons of an epoxy novolac resin including at least about 30% by weight multifunctional resin ("EPI-REZ SU-2.5"), and 2 gallons of γ-aminopropylaminotrimethoxy silane, a coupling agent ("Silane A-1120") was prepared. A second composition mixture consisting of 1.5 gallons of 2,4,6-tris(benzyldimethylammoniummethylene)benzyloxybenzene (the inventive substituted alkoxy benzene), 5.25 gallons of methanol and 15.75 gallons of a hardening agent consisting of approximately 63% by weight methylene dianiline and 37% by weight higher molecular weight oligomers of aniline and formaldehyde ("ANCAMINE DL-50") was also prepared.

The first composition mixture and the second composition mixture were mixed together on the job site during the fracturing treatment. A total of 52.5 gallons of a stream of the first mixture were admixed with a total of 22.5 gallons of a stream of the second mixture in a chemical static mixture, fed by computer controlled chemical metering pumps for continuous "on-the-fly" mixing.

In the final step described above, continuous streams of Gel Formulation B, the 20/40 mesh frac sand, the surface active agent, the polyepoxide resin composition (the first composition mixture and second composition mixture as described above combined) and the gel breakers were conducted to a fracturing blending tub where they were admixed and a gelled aqueous carrier liquid having the sand coated with the polyepoxide resin composition suspended therein was formed. The average residence time in the fracturing blending tub was less than 15 seconds as the suspension was pumped into the well at a rate of 30 to 35 barrels per minute. The suspension was displaced down the tubing to the top perforation with sufficient fluid and pumping was stopped. After shutting in the well overnight, tubing was run into the well to wash out sand in the well bore. Less than three sacks of sand were washed out. As no further sand was encountered, the well was readied for production with a pump on the bottom of the tubing and put on production. No further sand had been produced as of three months following the time the well was put on production. During this three month period, well production was about five times greater than the well production before the fracture stimulation treatment.

In fracturing treatments carried out on similar wells without adding a polyepoxide resin composition to the proppant during the last phase of the fracturing treatment, up to 200 sacks of sand were washed from the well during the initial clean-out step and sand continued to be present in the produced fluid for several months thereafter. Production was increased by closer to three times than what it was prior to these treatments as opposed to the five-fold increase in production achieved using the polyepoxide resin composition.

Thus, the present invention is well adapted to carry out the objects and attain the ends and advantages mentioned as well as those which are inherent therein. The preceding examples can be repeated with similar success by substituting the generically or specifically described components and/or operating conditions of this invention for those used in the examples.

Furthermore, although certain preferred embodiments of the invention have been described for illustrative purposes, various modifications and innovations of the preferred embodiments may be effected without departure from the basic principles which underlie the invention. Changes of this type are deemed to lie within the spirit and scope of the invention except as may be necessarily limited by the appended claims and reasonable equivalents thereof.

What is claimed is:

1. A method of continuously forming and suspending consolidatible resin composition coated particulate material in a gelled aqueous carrier liquid comprising:

admixing continuous streams of said gelled aqueous carrier liquid, uncoated particulate material, a polyepoxide resin composition that will subsequently harden and a surface active agent for enhancing the ability of said resin composition to coat said particulate material whereby said particulate material is continuously coated with said resin composition and suspended in said gelled aqueous carrier liquid, said resin composition being comprised of a hardenable polyepoxide resin, a substantially water immiscible diluent present in said resin composition in an amount sufficient to lower the viscosity thereof, a hardening agent and a wetting aid for enhancing the ability of said resin composition to coat said particulate material, said wetting aid being a substituted alkoxy benzene having the formula:

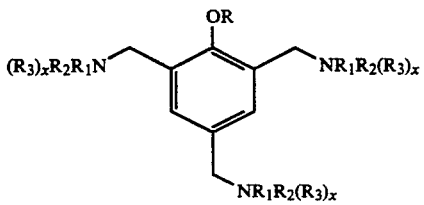

wherein R, $R_1$, $R_2$ and $R_3$ are each a hydrocarbon radical having from 1 to 8 carbon atoms, and x is 0 or 1, each nitrogen group ("$NR_1R_2(R_3)_x$") shown by said formula bearing a positive electrical charge on the central nitrogen atom and a corresponding negative counter ion when x is 1.

2. The method of claim 1 wherein x of said formula of said substituted alkoxy benzene is 0 and $R_1$ and $R_2$ of said formula are each a methyl radical.

3. The method of claim 2 wherein R of said formula is a methyl radical, a benzyl radical, an acetyl radical or a disubstituted alkyl radical.

4. The method of claim 3 wherein R is a methyl radical, a benzyl radical or an acetyl radical.

5. The method of claim 1 wherein x of said formula of said substituted alkoxy benzene is 1, R of said formula is an acetyl radical or a benzyl radical, and $R_1$ of said formula is a benzyl radical or methyl radical and $R_2$ and $R_3$ of said formula are each a methyl radical if R is an acetyl radical, and $R_1$ is a benzyl radical and $R_2$ and $R_3$ are each a methyl radical if R is a benzyl radical.

6. The method of claim 1 wherein said polyepoxide resin of said resin composition includes at least about 20% by weight of a multi-functional epoxy novolac resin.

7. The method of claim 1 wherein said substantially water immiscible diluent of said resin composition includes a reactive diluent selected from the group consisting of butyl glycidyl ether, cresol glycidyl ether and trimethylolethane triglycidyl ether.

8. The method of claim 1 wherein said hardening agent of said resin composition is selected from the group consisting of di-functional and multi-functional cycloaliphatic and aromatic amines and adducts of said amines with aromatic based epoxy or polyglycidyl aromatic ethers.

9. The method of claim 5 wherein R and $R_1$ of said formula of said substituted alkoxy benzene are each a benzyl radical and $R_2$ and $R_3$ of said formula are each a methyl radical.

10. The method of claim 1 wherein said wetting aid is prepared by reacting 2,4,6-tri(dimethylaminomethylene)phenol with a base having a pH greater than or equal to 10 to form a phenoxide and reacting said phenoxide with an alkyl halide to form a first product, and reacting said first product with an alkyl halide to form a trisammonium salt.

11. The method of claim 1 wherein said substantially water immiscible diluent of said resin composition includes a non-reactive diluent selected from the group consisting of compounds having the structural formula:

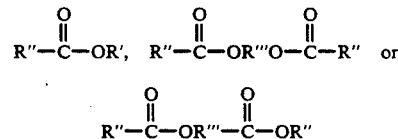

wherein R' is $C_nH_{2n+1}$ in which n is an integer of from about 1 to about 5;

R" is $C_mH_{2m+1}$ wherein m is an integer of from 1 to about 4, or R" is

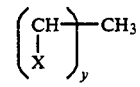

wherein y is an integer of from 1 to about 4 and X is H or OH; and

R''' is $C_aH_{2a}$ wherein a is an integer of from 2 to about 5.

* * * * *